(12) United States Patent
Pannel et al.

(10) Patent No.: US 6,701,387 B1
(45) Date of Patent: Mar. 2, 2004

(54) ADAPTIVE DATA FETCH PREDICTION ALGORITHM

(75) Inventors: Roger Pannel, Nashua, NH (US); David W. Hartwell, Bolton, MA (US); Samuel H. Duncan, Arlington, MA (US); Rajen Ramchandani, Arlington, MA (US); Andrej Kocev, Shirley, MA (US); Jeffrey Willcox, Westford, MA (US); Steven Ho, Westford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 396 days.

(21) Appl. No.: 09/652,644

(22) Filed: Aug. 31, 2000

(51) Int. Cl.[7] ............................................... G06F 13/00
(52) U.S. Cl. ...................... 710/22; 710/23; 710/28; 710/33; 710/36; 710/39; 710/52; 710/53; 710/56; 710/60; 710/107; 710/308; 710/310
(58) Field of Search .............................. 710/22, 23, 28, 710/33, 36, 39, 52, 53, 56, 60, 107, 308, 310

(56) References Cited

U.S. PATENT DOCUMENTS

| | | | |
|---|---|---|---|
| 5,420,991 A | 5/1995 | Konigsfeld et al. | 395/375 |
| 5,463,753 A | 10/1995 | Fry et al. | 395/473 |
| 5,504,900 A | 4/1996 | Raz | 395/650 |
| 5,524,214 A * | 6/1996 | Kurihara | 710/56 |
| 5,546,582 A | 8/1996 | Brockmeyer et al. | 395/650 |
| 5,551,005 A | 8/1996 | Sarangdhar et al. | 395/472 |
| 5,784,698 A * | 7/1998 | Brady et al. | 711/171 |
| 5,802,569 A | 9/1998 | Genduso et al. | 711/137 |
| 5,881,316 A * | 3/1999 | Chaney et al. | 710/56 |
| 5,900,020 A | 5/1999 | Safranek et al. | 711/167 |
| 6,092,127 A * | 7/2000 | Tausheck | 710/56 |
| 6,243,769 B1 * | 6/2001 | Rooney | 710/56 |
| 6,279,052 B1 * | 8/2001 | Upadrastra | 710/22 |
| 6,339,803 B1 * | 1/2002 | Glassen et al. | 710/52 |

OTHER PUBLICATIONS

Excerpts of PCI specification.
Excerpts of PCI–X specification.

* cited by examiner

Primary Examiner—Jeffrey Gaffin
Assistant Examiner—Mohammad O. Farooq (57) ABSTRACT

A method and apparatus for accommodating the speed requirements of a DMA read request from PCI protocol I/O devices attached via a DMA to a multiprocessor system mesh. A bridge between the device controller and the mesh is described which buffers the data from the memory in cache lines from which the data is delivered finally to the I/O device. The system is adaptive in that the number of cache lines required in past reads are remembered and used to determine if the number of cache lines is reduced or increased.

9 Claims, 12 Drawing Sheets

ADAPTIVE DATA FETCH PREDICTION ALGORITHM

RELATED APPLICATIONS

This patent application is related to the following co-pending, commonly owned U.S. Patent Applications, all of which were filed on even date with the within application for United States Patent and are each hereby incorporated by reference in their entirety:

U.S. Pat. No. 6,456,510 entitled UNIQUE METHOD OF REDUCING LOSSES IN CIRCUITS USING $V^2$ PWM CONTROL;

U.S. patent application Ser. No. 09/652,641 entitled IO SPEED AND LENGTH PROGRAMMABLE WITH BUS POPULATION;

U.S. patent application Ser. No. 09/652,458 entitled PARTITION FORMATION USING MICROPROCESSORS IN A MULTIPROCESSOR COMPUTER SYSTEM;

U.S. patent application Ser. No. 09/944,517 entitled SYSTEM AND METHOD FOR INCREASING THE COUNT OF OUTSTANDING SPLIT TRANSACTIONS;

U.S. patent application Ser. No. 10/611,569 entitled SYSTEM AND METHOD FOR PROVIDING FORWARD PROGRESS AND AVOIDING STARVATION AND LIVELOCK IN A MULTIPROCESSOR COMPUTER SYSTEM;

U.S. patent application Ser. No. 09/653,180 entitled ONLINE CONTROL OF A MULTIPROCESSOR COMPUTER SYSTEM;

U.S. patent application Ser. No. 09/652,494 entitled AUTOMATED BACKPLANE CABLE CONNECTION IDENTIFICATION SYSTEM AND METHOD;

U.S. patent application Ser. No. 09/652,459 entitled ENHANCED CLOCK FORWARDING DATA RECOVERY;

U.S. patent application Ser. No. 09/652,980 entitled CLOCK FORWARD INITIALIZATION AND RESET SIGNALING TECHNIQUE;

U.S. patent application Ser. No. 09/944,515 entitled PASSIVE RELEASE AVOIDANCE TECHNIQUE;

U.S. patent application Ser. No. 09/652,985 entitled COHERENT TRANSLATION LOOK-ASIDE BUFFER;

U.S. patent application Ser. No. 09/652,645 entitled DETERMINISTIC HARDWARE BEHAVIOR BETWEEN MULTIPLE ASYNCHRONOUS CLOCK DOMAINS THROUGH THE NOVEL USE OF A PLL; and U.S. patent application Ser. No. 09/655,171 entitled VIRTUAL TIME OF YEAR CLOCK.

BACKGROUND OF THE INVENTION

1. Field of the Invention

The present invention relates generally to direct memory access (DMA) read operations, and, more particularly, to DMA read transfers from input/output (I/O) devices attached to a multiprocessor system with shared resources.

2. Background Information

Direct memory access (DMA) between a main processor memory and an I/O device, where the transfers of the data are made exclusive of the processor, has been routinely accomplished in computing systems for many years. So, only a brief introductory discussion is presented herein.

The use of a DMA channel is rooted in making for more efficient data transfers, often where speed is a factor. Using a programmed or memory mapped input/output transfer requires executing program instructions for each data transfer, thereby reducing the speed (sometimes referred to as bandwidth) of the data transfers. This may result in the I/O device waiting. In contrast, DMA controllers take direct control of logic signals on the memory bus itself, and thereby it can effect data transfers by logic circuitry directly operating the read/write/status/etc. lines of the memory itself. This well known operation often takes the form of the DMA controller monitoring the "busy" line of the memory, and, when not busy, the DMA device asserts exclusive control of the memory bus and performs the reads or writes as previously determined.

Although speed is often the main factor is using DMA, other system constraints and/or requirements may convince the designer to interface an I/O device via a DMA controller. For example, having the data transfers, even if slow, occur completely in the background with respect to operating programs may warrant the use of a DMA controlled device.

In general, for any I/O device, including DMA controlled devices, "control" information must be transferred between an I/O controller/device and the processor. For example, some of the types of information that may be directed to a DMA controller might be the memory address(es) to which the data transfers are directed, a count of the number of bytes to be transferred, a signal enabling the start of the data transfers, and an indicator of which interrupt line is to be used by the controller to signal when the transfers are complete. In addition to control information, there will be the actual data transfers between the processor and the controller/device. Examples of data might include the text that appears on a monitor or an application program being uploaded into the processor. "Control" and "data" are the terms used herein to distinguish these types of information.

The control information may be passed in several ways. One such way is by programmed I/O, another approach is by programmable or firmware logic in the DMA controller, a third way is to have DMA transfers of control information in addition to DMA transfers of data. Combinations of the above may also be used as known by practitioners in the art.

The discussion above is not meant to be inclusive of all the functions and implementations used with DMA controllers. The above is only to note that such control and operations of DMA controllers and devices interfaced thereto are well known, and that practitioners in the art know how to design hardware, software and/or firmware to implement such DMA controllers.

DMA controllers become much more complex when interfaced to multiprocessor systems. For example, the DMA controllers may be configured to accommodate a great number of I/O devices operating under a wide variety of I/O protocols. For example an accelerated graphics port (AGP), a peripheral computer interconnect (PCI), and a peripheral computer interconnect extension (PCI-x) are well known protocols that are used to interface many I/O devices. Some of these devices might exhibit high data rates, such as, fiber optic communication channels. Each processor in the multiprocessor systems may have locally controlled hardware, memory, and I/O, but the multiple processors also share hardware and software resources. The multiprocessor system with the interconnected shared resources are herein referred to as the "mesh."

The DMA controller is designed to satisfy the mesh on one side and the I/O devices on the other. Designers are often concerned that the shared memory being used by the DMA data transfer may reside at the far end of the mesh from the I/O device, that the mesh may be busy, and that there may be a number of DMA devices with large amounts of data needing attention. These factors will affect "latency" which is the time it takes the mesh to respond with data after a request for the data is received by the mesh. The memory in these multiprocessor systems is designed primarily to accommodate the processors in the system. This might mean sixty-four or longer word bit widths, and transfers might be made with eight hundred or higher megaHertz (MHz) clocks. But the I/O device usually will have different clock speeds and different word lengths. DMA controllers are arranged to "bridge" these two environments and fulfill the requirements of the mesh and the I/O device. For these and other such reasons, it is common to find buffer memory in DMA controllers.

In some known designs the buffer memory or cache is used to buffer pre-fetched data when a DMA read request is received. Pre-fetch means that the data is received by the device controller before actually being requested. But, the design of the cache system for the pre-fetched data includes some tradeoffs and limitations. For example the cache may buffer a given amount of data that was pre-fetched in response to a read request from a device, but, if the device controller can not accept the amount, the unused cache data would have been pre-fetched unnecessarily. If the data remains in the cache waiting for a retry by the device, the cache is not useful to any other device. In either case the cache is used inefficiently. On the other hand, if the cache is reduced, and the device required more data than the cache holds, then the device would drain the cache empty and would have to assert another request for the rest of the data. The result is that the device would be slowed down.

Another limitation with a fixed cache is that all devices on the same I/O DMA bus would share the same cache and any pre-fetching will not likely match the needs of all the supported I/O devices.

It is an object of the present invention to address the above tradeoff to provide an efficient balance between the size of cache resources in DMA controllers and the speed requirements of I/O devices.

SUMMARY OF THE INVENTION

The above limitations are overcome by the present invention that provides an adaptive allocation of cache in a DMA controller. When initialized, the DMA controller allots a selected amount of cache for a device attached to the controller via an I/O bus. The amount may be initially determined as sufficient by the system designer when the particular type of I/O device was contemplated. However, in accordance with the present invention, the allocation of the cache is modified dynamically as a function of past usage by the I/O device.

When an I/O device (via the controller) requests or uses an amount of cache different from the amount previously allotted, the DMA controller stores the difference in amount of data pre-fetched against the amount of data actually used. When subsequent requests are made by the I/O device, the allotted cache is increased or decreased as a function of an algorithm with logic preferably in hardware in the DMA controller so that eventually the amount of cache allotted and the requirements of the I/O device substantially match. In a preferred embodiment, and as discussed below, the cache is organized by blocks or "lines" of sixty-four bytes each. The algorithm uses the number caches lines requested by past requests and the utilization of the pre-fetched cache lines to determine if and by how much the cache allotted to this device should change.

An advantage of the present invention is that, if there are a number of different I/O devices sharing the same I/O data bus and DMA controller, the adaptive nature of a DMA controller made in accordance with the present invention allows each such I/O device to have a dynamically different allotment of cache lines. This allows an allotment of cache lines to each specific device that most nearly satisfies the needs of each device.

In a preferred embodiment, the algorithm uses the most recent sixteen I/O requests for multiple cache lines. The number of requests for more than a given number of bytes and the number requesting less than another number of bytes are compared. The number of cache lines allotted to the I/O device is a function of the difference between the two numbers. When more cache lines are to be allotted, the number of cache lines is doubled, and, when less cache lines are to be allotted, one cache line is removed.

BRIEF DESCRIPTION OF THE DRAWINGS

The above and further advantages of the invention may be better understood by referring to the following description in conjunction with the accompanying drawings, in which like reference numbers indicated identical or functionally similar elements.

DETAILED DESCRIPTION OF AN ILLUSTRATIVE EMBODIMENT

Figure 1:
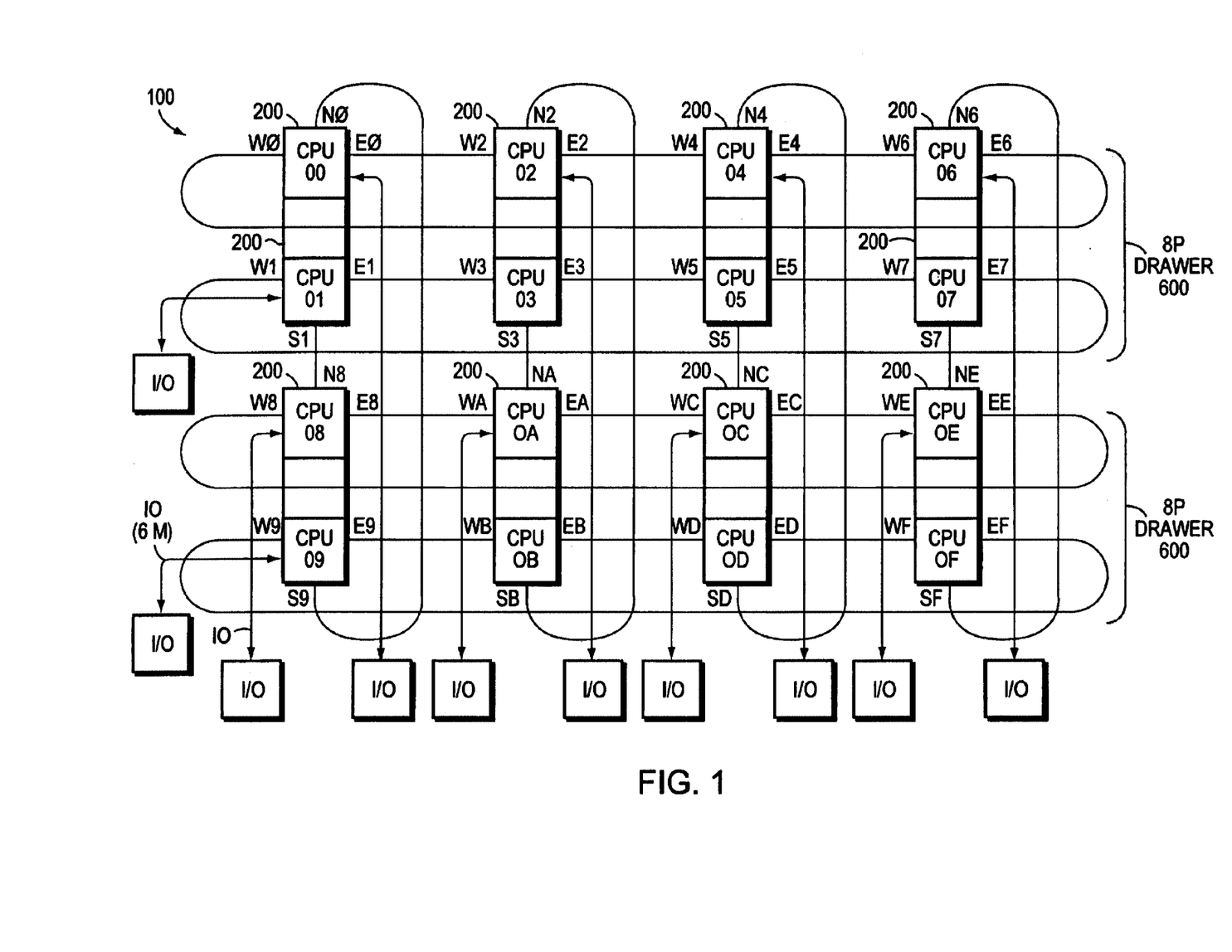
FIG. 1 is a schematic block diagram of a symmetrical multiprocessor (SMP) system comprising a plurality of dual processor (2P) modules interconnected to form a two dimensional (2D)-torus mesh configuration.

FIG. 1 is a schematic block diagram of a symmetrical multiprocessor (SMP) system 100 comprising a plurality of processor modules 200 interconnected to form a two dimensional (2D)-torus mesh configuration. Each processor module 200 comprises two central processing units (CPUs) with connections for two input/output (I/O) ports along with 6 inter-processor (IP) network ports. The network ports are preferably referred to as North (N), South (S), East (E) and West (W) compass points. The North-South (NS) and East-West (EW) compass point connections create a (manhattan) grid. Additionally, the outside ends of the mesh wrap-around and connect to each other. I/O traffic enters the 2D torus via an I/O channel connected to each CPU.

Each I/O channel has, in each directions (IN and OUT) 32 bits of data, a seven bit error correcting code, and clock signals. The signals to the I/O port are called "down hose" and the signals from the I/O port are called "up hose." The I/O connection is via a cable 10 that can be six meters long.

Figure 2:
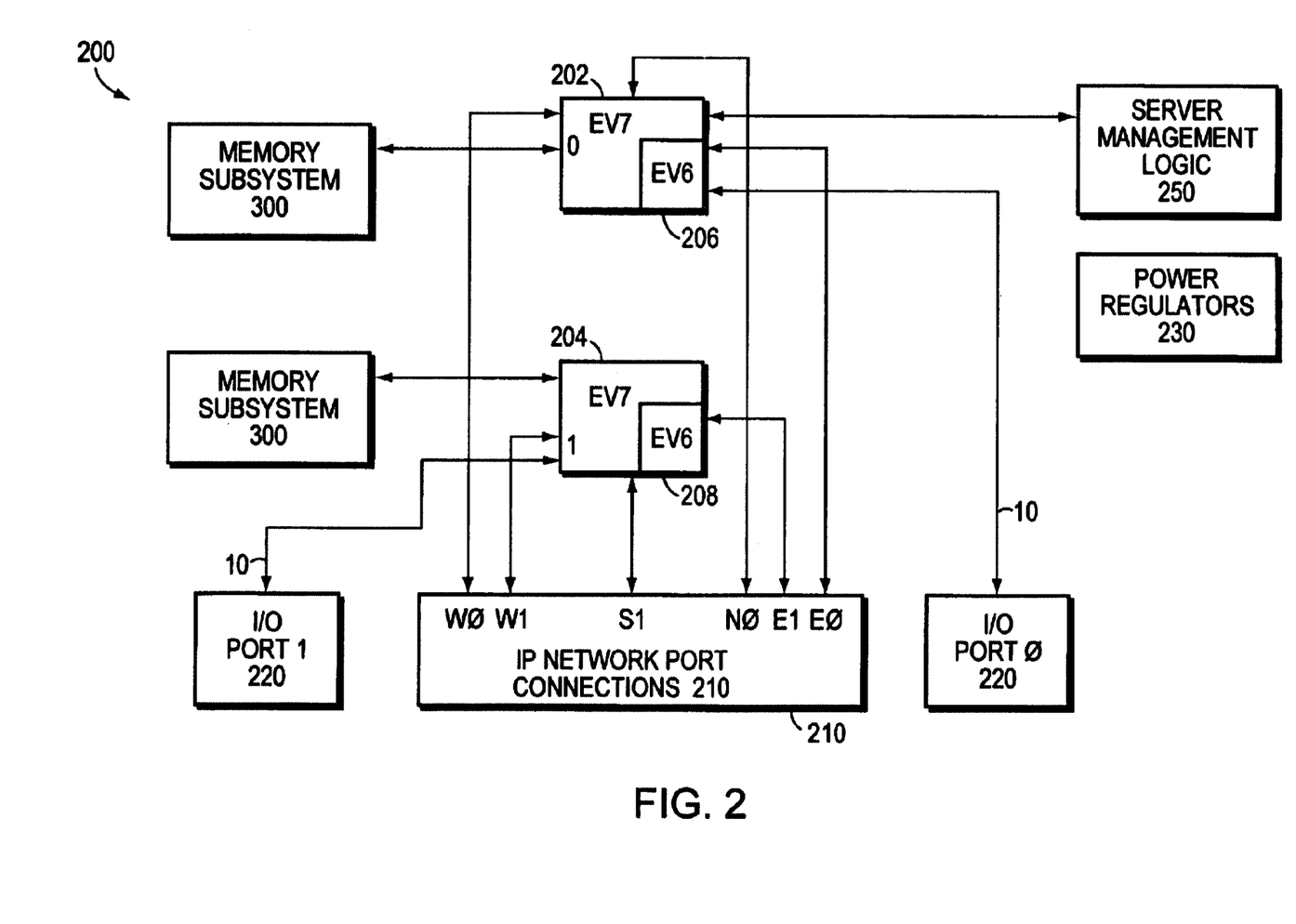
FIG. 2 is a schematic block diagram of a 2P module of FIG. 1.

FIG. 2 is a schematic block diagram of the dual CPU (2P) module 200. As noted, the 2P module 200 comprises 2 CPUS, 202, 204 with connections 210 for the IP ("compass") network ports and an I/O port 220 associated with each CPU. The 2P module 200 also includes power regulators 230, system management logic 250 and memory subsystem 300 coupled to two memory ports of each CPU. The system management logic 250 cooperates with a server management system to control functions of the SMP system 100. Each of the N, S, E and W compass points, along with the I/O and memory ports use clock-forwarding, i.e., forwarding clock signals with the data signals, to increase data transfer rates and reduce skew between the clock and data.

Each CPU 202, 204 is preferably an "EV7" processor that includes an "EV6" core 206 with two memory controllers, an I/O interface and four IP network ports. The EV6 core preferably incorporates a traditional reduced instruction set computer (RISC) load/store architecture. In the illustrative embodiment described herein, the EV6 cores are generally the Alpha® 21264 processor chips manufactured by Compaq Computer Corporation®, with the addition of an internal cache and an integrated cache controller. However, it will be apparent to those skilled in the art that other types of processor chips may be advantageously used.

The memory subsystem 300 is preferably implemented using RAMBUS technology and, accordingly, the memory space is generally divided between two RAMBUS controllers.

Figure 3A:
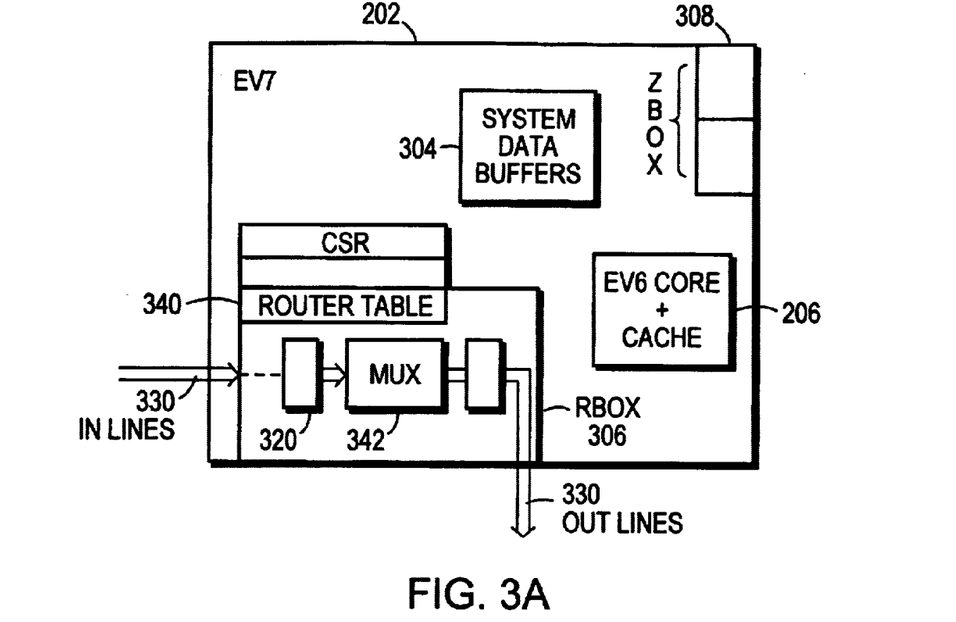
FIG. 3a is a schematic block diagram of an EV7.

FIG. 3A shows the EV7 202 in more detail. The EV7 includes a routing section (RBOX) 306, an EV6 206 with cache, system data buffers 304, and two memory controllers (ZBOX) 308. The RBOX 306 provides integrated system routing and network control with respect to: the compass point IP ports interconnecting to and from the mesh; into and out from the I/O, the ZBOX 308; the EV6 core/cache 302; and the internal system data buffers 304.

Figure 3B:
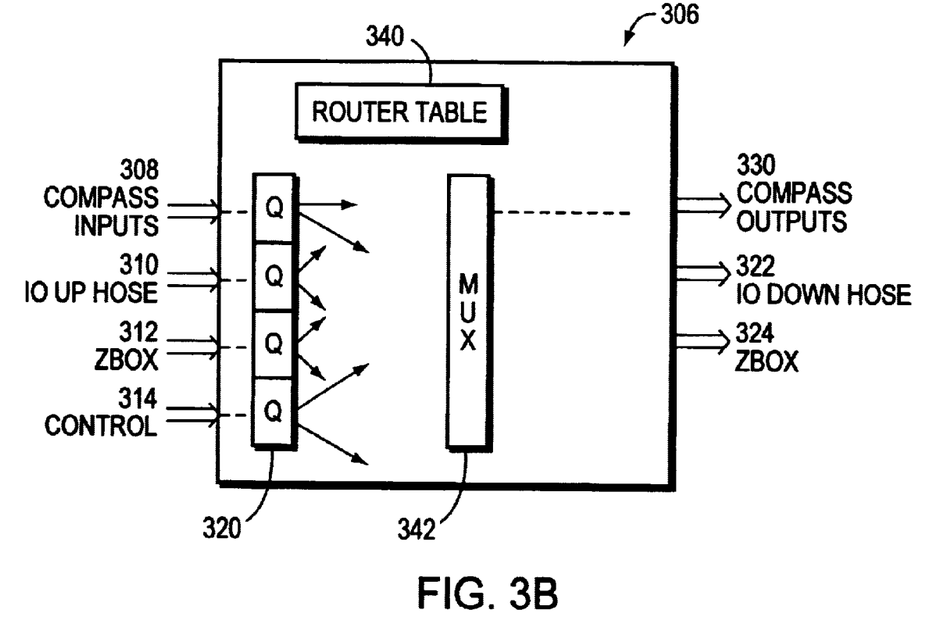
FIG. 3b is a schematic block diagram of the RBOX of and EV7.

The internal organization of the data paths in the RBOX is shown in more detail in FIG. 3B. The data, in from the mesh 308, in from the I/O 310, in from ZBOX 312, and in from control lines 314, are each queued 320. This queued input data from any of the sources are input to a multiplexer (MUX) 342 that routs the signals out to: the mesh 330, the I/O 322 or the ZBOX 324. The control signals 314 and the routing table 340 are provided to control the MUX. With respect to the present invention, I/O connection 310 is the data portion of the up hose and I/O connection 322 is the data portion of the down hose.

Figure 4:
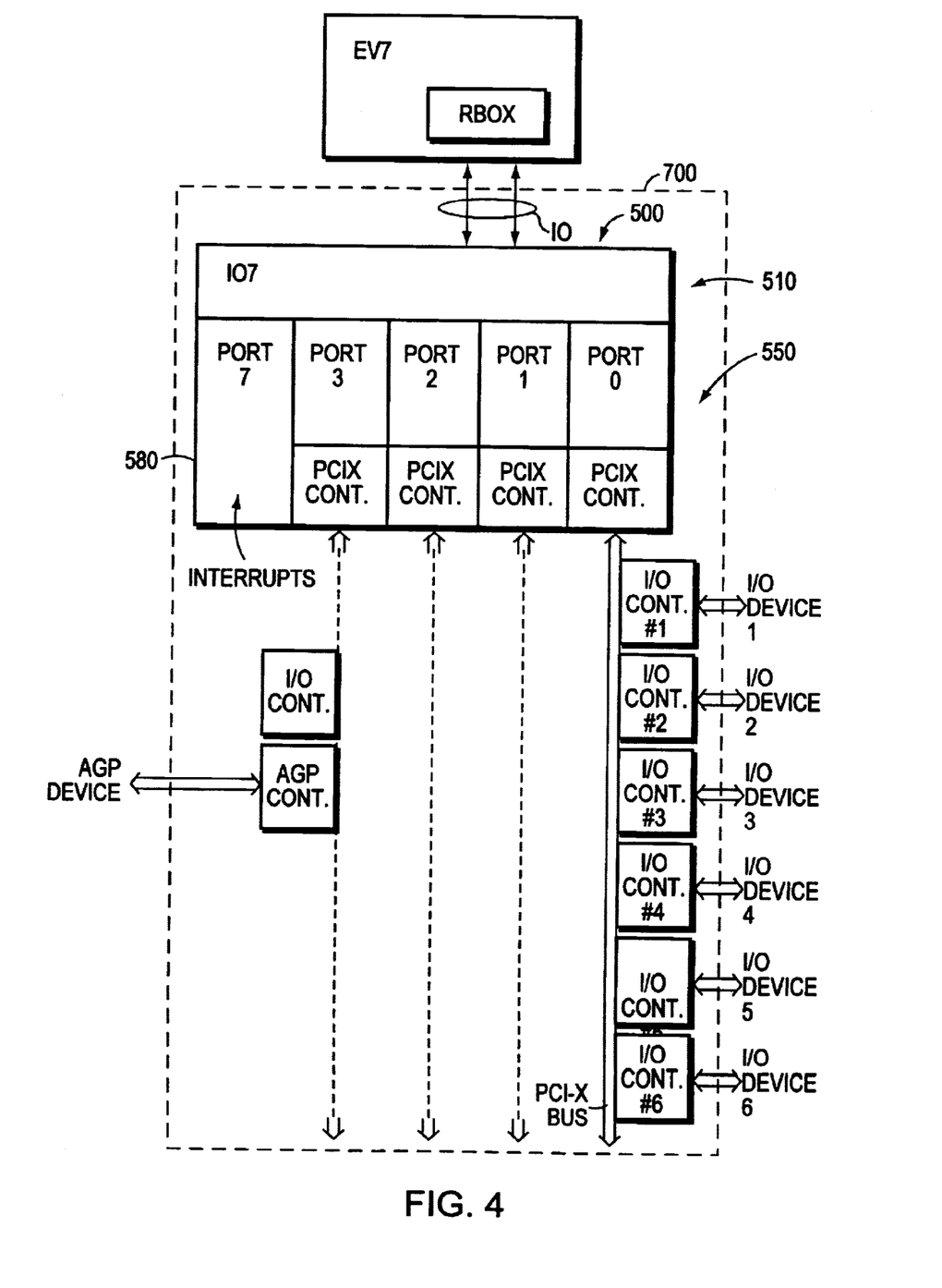
FIG. 4 is a schematic block diagram of an IO7 of an I/O subsystem of the SMP.

FIG. 4 is a schematic block diagram of an I/O controller IO7 500 that provides a flexible fundamental building block for the SMP I/O subsystem. The IO7 is preferably implemented as an application specific integrated circuit (ASIC). Each EV7 processor supports one I/O ASIC connection; however, there is no requirement that each processor have an I/O connection. In the illustrative embodiment, the I/O subsystem includes a PCI-x I/O expansion box with hot-swap PCI-x and AGP support. The PCI-x expansion box includes an IO7 plug-in card that spawns the four I/O buses 560 to which all the I/O devices on this IO7 are connected.

In the illustrative example of FIG. 4, ports 0, 1, and 2 (P0, P1, P2) each interface to a PCI-x bus with as many as six controllers connected to each. The entire I/O system is housed, preferably in the box 700 discussed later with respect to FIG. 6. The bus is referred to as a PCI-x bus, but PCI convention controller printed circuit cards and PCI-x controller card can be attached to this bus. Port 3 (P3) is structured to accept one accelerated graphics port (AGP) 562. In accordance with an aspect of the present invention, a cache coherent domain of the SMP system extends into the IO7 500 and, in particular, to I/O caches located within each I/O port P0–P3. Specifically, with reference to FIG. 8, the cache coherent domain extends to a write cache (562), a read cache (564) and a translation look aside buffer (TLB 566) located within each I/O port 600. As described further herein, the caches function as coherent buffers in that the information contained within these data structures are not maintained for long periods of time.

The operational aspects of the I/O are discussed later after a brief discussion of the physical layout of the SMP system and the I/O.

Figure 5:
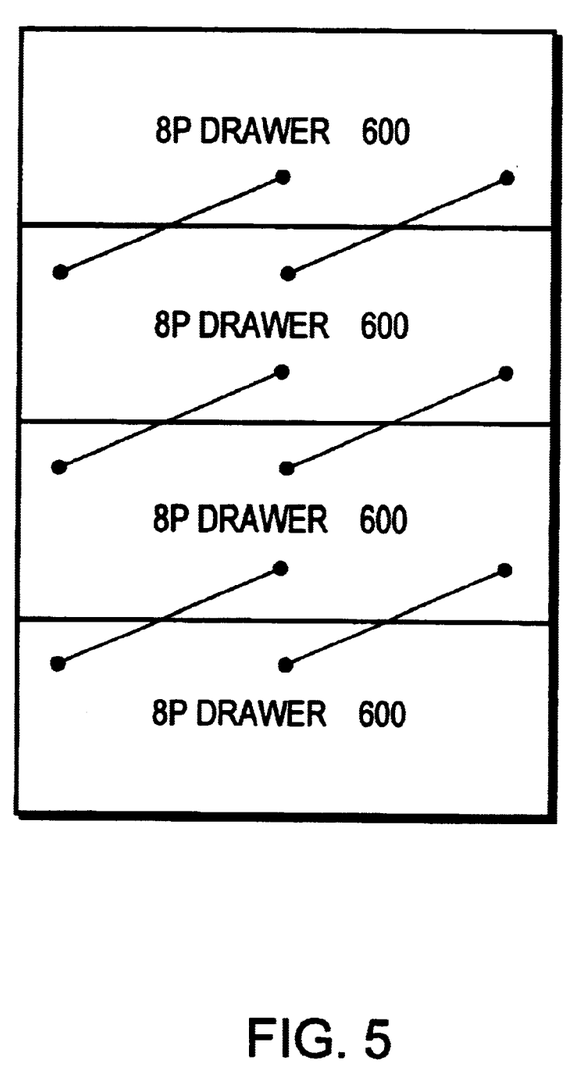
FIG. 5 is a schematic diagram of an illustrative embodiment of four (4) 8P drawers of the SMP system mounted within a standard 19 inch rack.

Referring to FIG. 5, the two dimensional torus configuration of the SMP system 100 (of FIG. 1) comprises sixteen (16) EV7 processors interconnected within two 8P drawer enclosures 600. Specifically, there are four 2P modules interconnected by a backplane within each enclosure 600. This configuration is preferably scalable by powers of 2 (EV7 processors) up to a total of 256 (or preferably 128) processors. In the illustrative embodiment, four 8P drawers may be mounted within a standard 19-inch rack (2 meters in length) as shown in FIG. 5.

Figure 6:
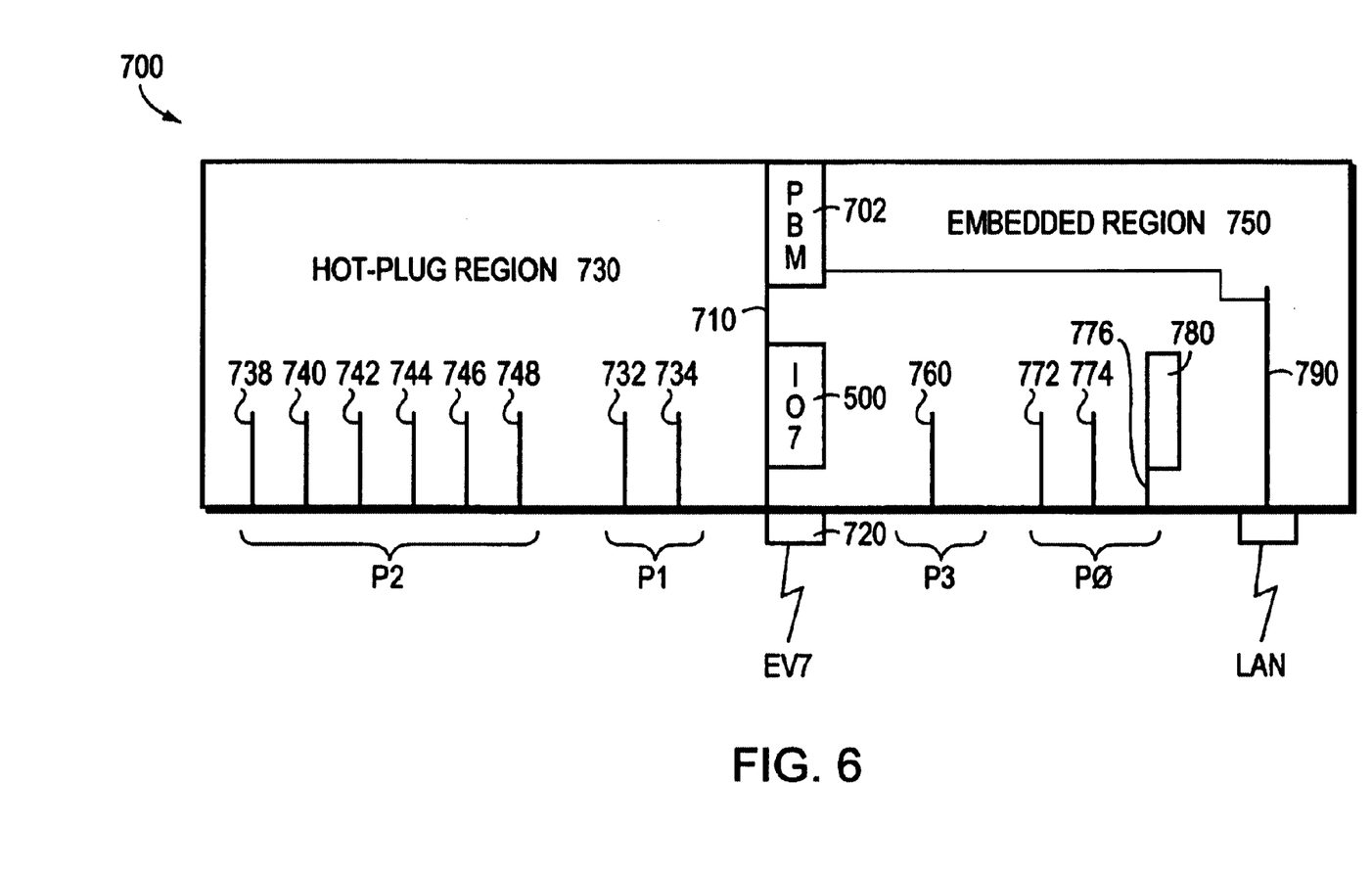
FIG. 6 is a schematic block diagram of an I/O drawer of the SMP system.

FIG. 6 is a block diagram of an I/O drawer 700 of the SMP system (100 of FIG. 1) which includes a first I/O riser card 710 containing an IO7 500, a connector 720 coupling the IO7 to the EV7 processor and a plurality of I/O slots bussed to the IO7. There are four ports P0. P1, P2, and P3 controlled by the IO7. Each port is connected to a number of slots as shown. Certain control aspects are provided by the IO7. Each slot can accepts an I/O printed circuit card, and each slot is provided with an opening for a cable (not shown). The cable may be a fiber optics cable directly or a cable to the I/O device itself. The I/O drawer is divided into two parts: a hot-plug region 730 and an embedded region 750. "Hot plug" refers to the ability of the card to be swapped out without powering down, or re-initializing the entire system. "Embedded" refers to I/O that is not hot-plugged and may contain I/O devices that are usually present in system designs. In the illustrative embodiment, there is a dedicated slot 760 adjacent to the I/O riser card 710 within the embedded region 750 that is dedicated to a AGP graphics card. Also included within the embedded region 750 are three standard, 64-bit PCI card slots 772–776, two of which may be blocked by an AGP Pro card if installed in lieu of a standard AGP card. Otherwise, these PC slots are available for embedded I/O card options. For example, an I/O standard module card 780 that controls a specific IO device may be inserted within one of the PCI slots 772–776.

Each I/O drawer 700 also includes power supplies, fans and storage/load devices (not shown). The I/O standard module card 780 contains an IDE controller for the storage/load devices, along with a SCSI (small computer serial interface) controller for those devices and a universal serial bus that enables keyboard, mouse, CD and similar input/output functions. The embedded region 750 of the I/O drawer is typically preconfigured and not configured for hot-swap operations. In contrast, the hot-plug region 730 includes a plurality of slots adapted to support hot-swap. Specifically, there are two ports 732–734 of the hot plug region dedicated to I/O port one (P1 of FIG. 5) and six slots 738–748 dedicated to I/O port two (P2 of FIG. 4). Likewise, the dedicated AGP slot 760 comprises port three (P3), and the three standard PCI slots 772–776 comprise port zero (P0). The I/O buses in the hot-plug region 730 are configured to support PCI and PCI-x standards operating at 33 MHz, 66 MHz, (50 MHz, 100 MHz) and/or 133 MHz. Howver, not all slots are capable of supporting all of these operating speeds due to physical constraints with the preferred implementation Also included within the I/O drawer 700 and coupled adjacent to the IO7 is a PCI backplane manager (PBM) 702. The PBM is an integral part of a platform management infrastructure as described further herein. The PBM is coupled to a local area network (e.g., 100 base T Ethernet) by way of another I/O riser board 790 within the I/O drawer. The local area network (LAN) provides an interconnect for the server management platform that includes, in addition to the PBM, a CPU management module (CMM) located on each 2P CPU module and an MBM (Marvel backplane manager) located in each 8P drawer.

Figure 7:
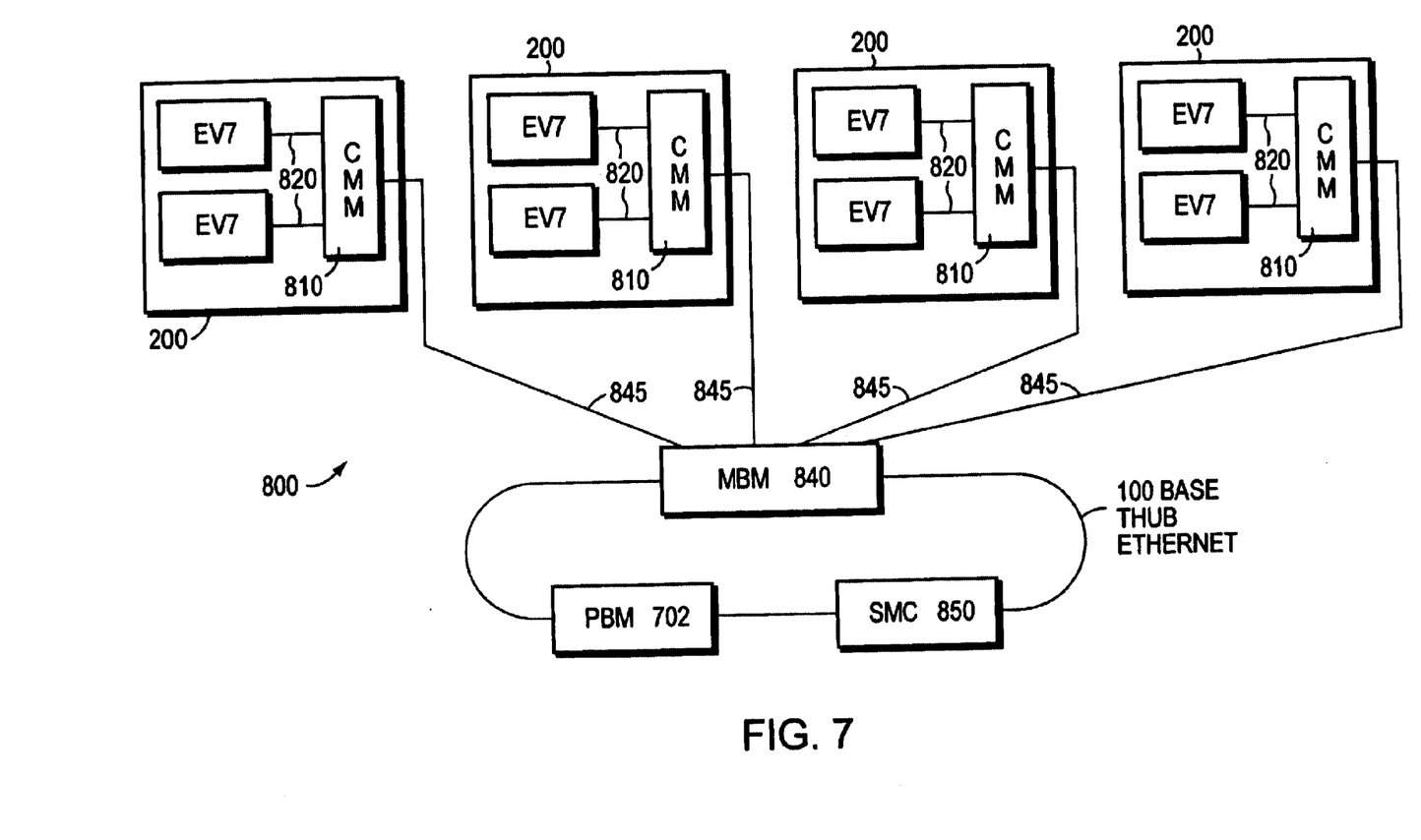
FIG. 7 is a schematic block diagram of a server management platform for the SMP system.

FIG. 7 is a schematic block diagram of the server management platform 800 for the SMP system. The server management comprises a 3-tier management scheme. At the lowest level, each 2P module 200 has a plug-in, CMM 810 that provides power and initialization control for the local 2P module. The CMM also interfaces directly to both EV7 processors via serial links 820 and provides debug, initialization, error collection and communication support to a higher, intermediate level of the service management hierarchy.

The intermediate level of service management is provided by the MBM 840, which is preferably an independent plug-in card within an 8P drawer 600. Each CMM 810 on each 2P module 200 within an 8P drawer 600 communicates with an MBM 840 through a point-to-point serial connection 845 that is preferably implemented in etch so as to obviate the need for a cable connection. The MBM controls the overall operation of the intermediate level by functioning as the master of the CMMs. In the illustrative embodiment, each MBM controls four CMM devices within an 8P drawer.

A personal computer or similar network device connected to one of the ports of the service management LAN hub serves as a server management console (SMC) 850. The SMC 850 provides the highest level of server management and, to that end, executes a platform management utility that provides a unified view of the entire SMP system for purposes of controlling the system. From a physical implementation, the MBMs, PBMs and SMC are coupled to the service management hub; however, logically they are interconnected by the LAN.

Figure 8:
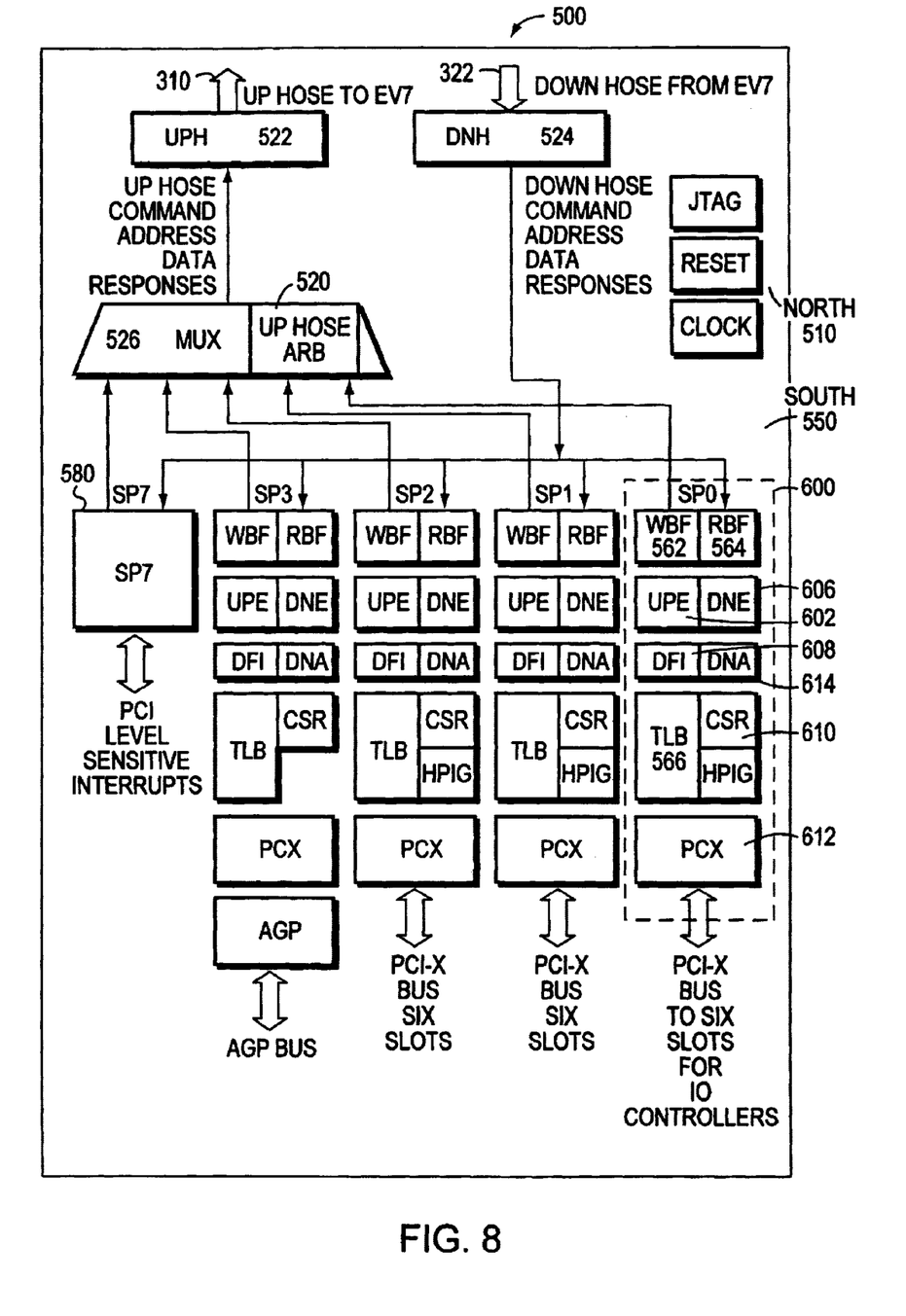
FIG. 8 is another more detailed schematic block diagram of an IO7.

Reverting back to the operation of the I/O system as in FIG. 8, which is FIG. 4 with some additional components. The IO7 500 comprises a North circuit regions 510 that interfaces with the corresponding EV7 processor, and a South circuit region 550 that that includes a plurality of I/O ports (P0–P3, P7) that interface to I/O buses that might use several different standards. The North circuit region 510 couples to the EV7 processor via two unidirectional, clock forwarding links, the up hose 310 and the down hose 322. The clocks, in this preferred embodiment, transfer data on the rising and the falling edges.

The IO7 receives from the EV7 command, address and data in packet form via the down hose 322. Similar information in packet form is sent up to the EV7 via the up hose 310. The logical format of the packets going up is accomplished in item 522 and in item is 524 for packets coming down. Packet formats are well known in the art. A five to one MUX 526 selects which of the four I/O ports (P0, –P3) and the interrupt port (P7) are connected to the up hose 310. An up hose arbiter 528 determines which is selected depending on which needs service and the type of service. The default in a preferred embodiment gives priority to P7. As known in the art, when the system is first connected priorities will be determined on the type and requirements of the I/O devices, including, but not limited to, their bandwidth, their real time requirement, buffer capacities, their latency, and other such requirement that are specific to individual I/O devices.

FIG. 8, item 600 refers to one port, P0. The major components and functions of this port are shown. Those components are: a write buffer, also called a write cache, (WBF) 562; a read buffer (RBF) 564; an up hose engine (UPE) 602; and down hose engine (DNE) 566; a forward address buffer (DFI) 608, and down hose addresses (DNA) 614; a translation buffer 566 which resolves I/O and mesh addresses; a control and status register (CSR) 610; a hot plug interface, and the PCI-x bus itself 612.

Figure 9:
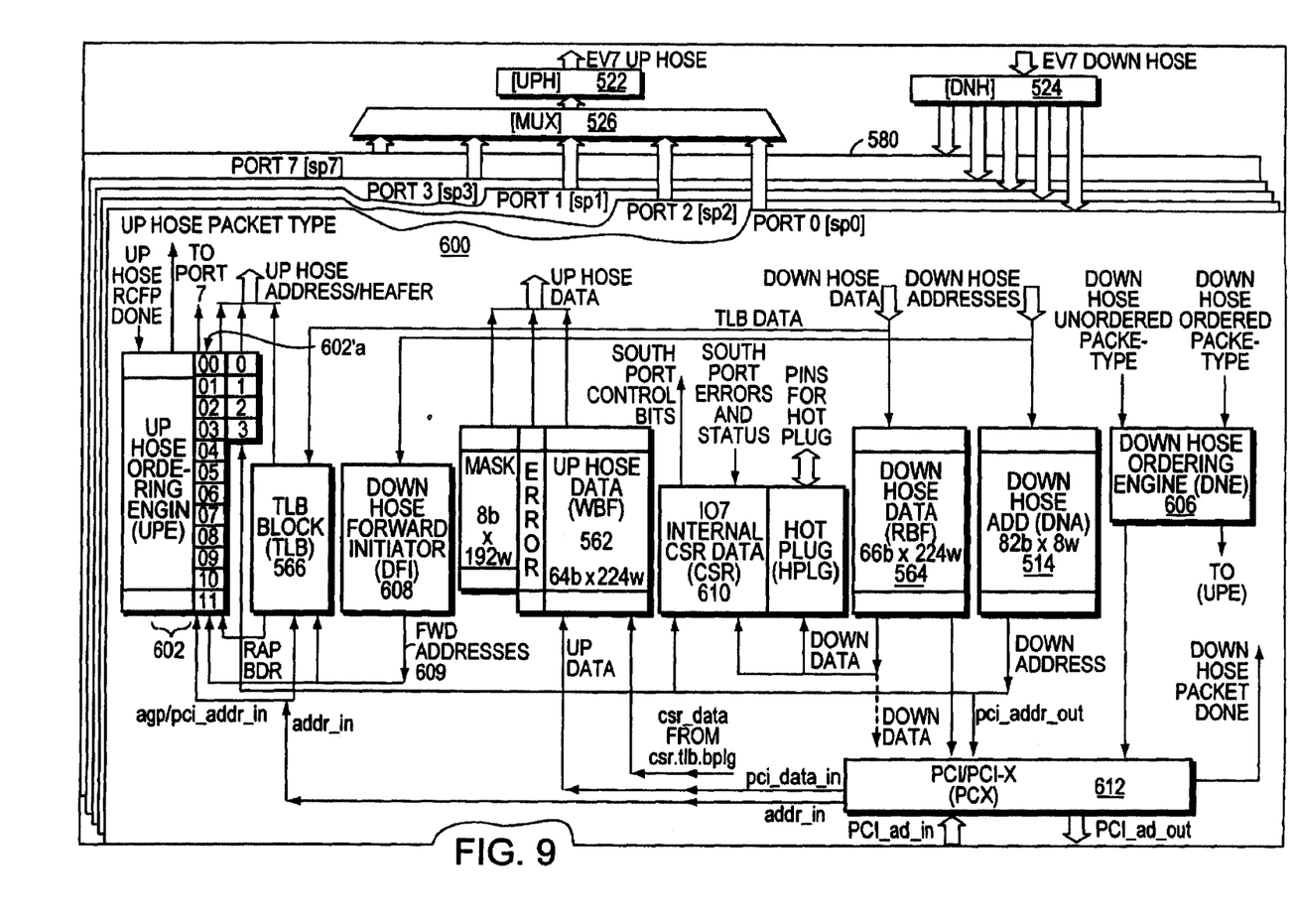
FIG. 9 is a schematic block diagram of one port of an I/O7.

FIG. 9 is another view of the I/O port 600 of FIG. 8 showing more detail of the control and data/address interconnections. Of particular interest is the UPE 602 which includes item 602a. The control signals to the 602a come from the TLB 566, the down hose forwarding initiator 608, and the I/O address from the PCI/PCI-x 612 interface to the PCI-x bus. The 602a component has twelve address and state machines (00–11) that preferably are used to implement the present invention. The down hose address and data are stored in the read and write buffers 564 and 614, respectively.

The following descriptions are brief to give an overview of the data and command structure of the SMP system. These descriptions are not meant to be inclusive, but only to note the functions that exist in one system. Many different designs are known by those skilled in the art. The present invention uses some of the components and functions that will be described later with respect to FIG. 10.

The TLB 566 converts the PCI/AGP address to an EV7 mesh address and also contains the registers by which the I/O device can view the status of the EV7 system. The DFI 606 buffers eight forward addresses for the South port 0. The North port via the down hose inserts forwarding addresses that the DFI pops into the South port.

Forwarding addresses are those addresses that the EV7 has issued to the IO7 to resolve cache coherency. For example, IO7 issues an exclusive read of memory. The memory directory entry for that block in the home node (mesh node) updates the directory to indicate that the owner of the block is IO7. Now another IO7, or processor wishes to read/write that same block. The directory for that block indicates that the first IO7 is the owner and sends a forward request with an address to the first IO7. The first IO7 determines if it still has that block within its cache, and if so, relinquishes that block.

Forward addresses are also received by the TLB, as the TLB may need to relinquish that block. TLB translations occur when a PCI/PCI-X/AGP bus address is received by the Southport. The TLB translates this into an EV7/mesh address The down hose ordering engine DNE 606 provides the interface between the down hose and the state machines 602a via the UHE 602. The logic within the DNE insures that the ordering rules for data coherency are satisfied. The DNE comprises two state machines that synchronize information between the down hose 322 and the I/O ports. The DNE passes read I/O and write I/O requests to the PCI-x arbiter 612 and information to the UPE regarding valid data and other control functions. The DNA buffers down hose I/O read and write addresses. The RBF 564 has twenty-eight sixty-four byte blocks of buffer space. The up hose engine UPE has twelve address buffers/state machines for DMA read/write operations. The UPE also holds such information, such as peer to peer transfers that are not directly involved with the present invention. Each state machine controls 128 bytes of buffering resources for read and 128 bytes for write operations. The TLB translates the addresses that are stored to service the DMA writes and reads. The UPE also implements the up hose ordering rules to insure data is updated with sequential consistency. The UPE posts the PCI/AGP initiated commands and posts the responses to down hose commands in proper order.

Referring to FIGS. 3A, 3B, and FIGS. 8, 9 and 10. Generally, for a DMA write, the I/O device via its controller issues a memory write request, a write address for a cache block, which preferably contains sixty-four bytes, and sixty-four bytes of data to the IO7 500. The IO7 sends a request, via the RBOX 306 in the EV7 202 for exclusive ownership to the target (local or remote) memory controller ZBOX 308. The target memory controller returns ownership to the requesting processing system and hence to the 10 control system, and so to the I/O device. The IO7 issues address and memory write data to the target ZBOX.

Figure 10:
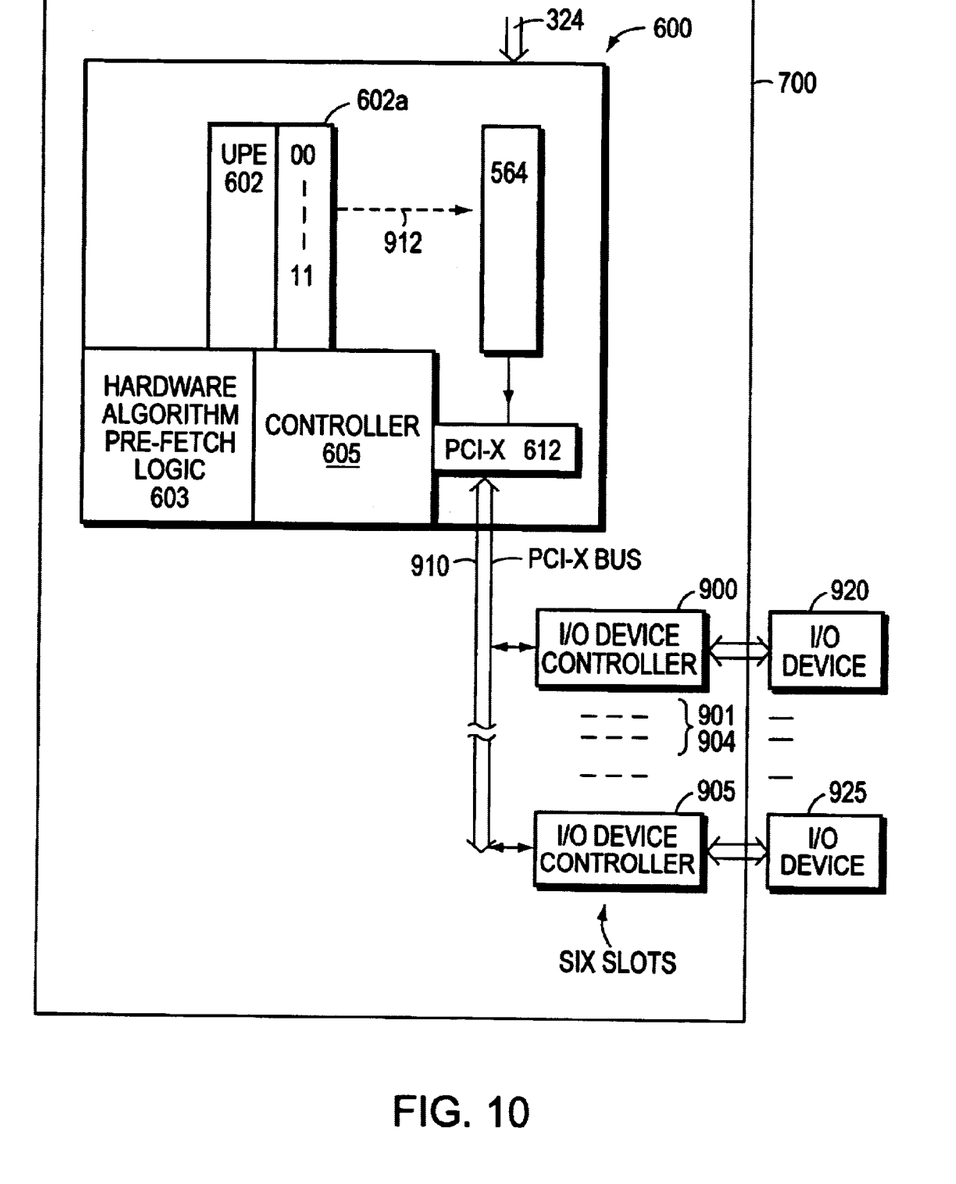
FIG. 10 is a partial schematic block diagram of port shown in FIG. 9.

FIG. 10 is a truncated version of FIG. 9 showing those portions of I/O port P0 600 involved with a DMA read operations via I/O device 920 connected to the port P0 600 via an I/O device controller 900 and the PCI-x bus 910.

In the present embodiment, the size of the read buffer 564 assigned to one DMA I/O device is adapted to the buffer size used or requested by the I/O device 920 and its device controller 900. It depends upon how much intelligence is designed into block 900. In general, IO devices 920 operate with different protocols. The IO device controller 900 translates these protocols into PCI/PCI-X protocols. The IO7 bridge translates this into EV7 packet protocols.

Generally for a DMA read, I/O device 920 issues a memory read request and a read address via the IO device controller 900, the PCI-x bus 910 to PCI-x logic 612 of the IO7 500. The request and address are passed to the EV7 via the up hose to the RBOX 306 of FIG. 3A. The RBOX router sends the request to its own ZBOX or to a ZBOX of a different EV7 as determined by the routing table in the RBOX (for the RBOX it is the same operation for a Write). The response to the read request and the read data travel back to the requesting EV7 500, via the down hose to the IO7, and finally the I/O device.

During a DMA read operation, the IO7 500 controller acts as a "bridge" between memory and the I/O device, where the bridge controls the read operation. For reference purposes, in some preferred embodiments the device 900 of FIG. 10 may be a SCSI connected disk or it may be a fiber optics communication link. Conceptually, the "bridge" is designed to act as a traffic controller of data passing over the bridge. There will be data on the bridge (in cache) and data coming to and going from the bridge. The bridge is designed to accommodate the specific I/O and the mesh requirements and constraints the exist on each end of the bridge.

Referring to FIG. 10, the UPE 602 preferably controls the data transfers between the EV7 and the I/O device, and, as part of that control, the twelve state machines 602a control 912 the assignment of the read cache 564 to the DMA I/O device. Each state machine controls two cache lines, and each cache line has sixty-four bytes. Therefore, there are sixteen cache lines available for a read buffer on each of the four (P0–P3) I/O ports. Preferably, two read cache lines are initially allotted to each of the I/O DMA devices, and as many as six I/O devices 920–925 may be attached to the I/O bus 910.

There are three types of read requests that may be issued by the I/O device. Controllers 900–905. The first is a Memory Read Plain where a long word (LW—two bytes) or a quad word (QW—four bytes) is read and delivered to the I/O device. The second is a Memory Read Line where the request is for up to a full cache line, and the third is a Memory Read Multiple where the request is for more than one cache line. The IO7 500 issues a RdModReq command to the EV7 in response to the device requests, except that two such RdModReq commands and a number of pre-fetches are issued in response to a Memory Read Multiple command. The number of pre-fetches is enough to retrieve and fill the cache lines presently allotted to the I/O device for DMA transfers. The fulfilling of the Memory Read Multiple requests conforms to the PCI delayed read protocol where the allotted cache lines are filled and then delivered to the I/O device.

There are six slots 900–905 available on the PCI-x bus 910. As mentioned above, when a Memory Read Multiple occurs, there will be pre-fetches that will fill those cache lines assigned to the device. When transferring this data, logic in the UPE 602 records and adjusts the number of cache lines to match the device requirements. The logic flow is an algorithm preferably embodied in the pre-fetch hardware logic 603 which is part of the PCI-x control logic. In an embodiment a counter 605 is employed. The system recognizes, as discussed below, when too much or too little pre-fetched data was delivered to the requestor DMA controller. The logic dynamically adjusts the number of cache lines to match the typical transfer size requested by the device. Referencing FIG. 10, a two bit binary counter 605 is initially set to 00 and is arranged not to be decremented when at binary "00" and not to be incremented when at "11."

Figure 11:
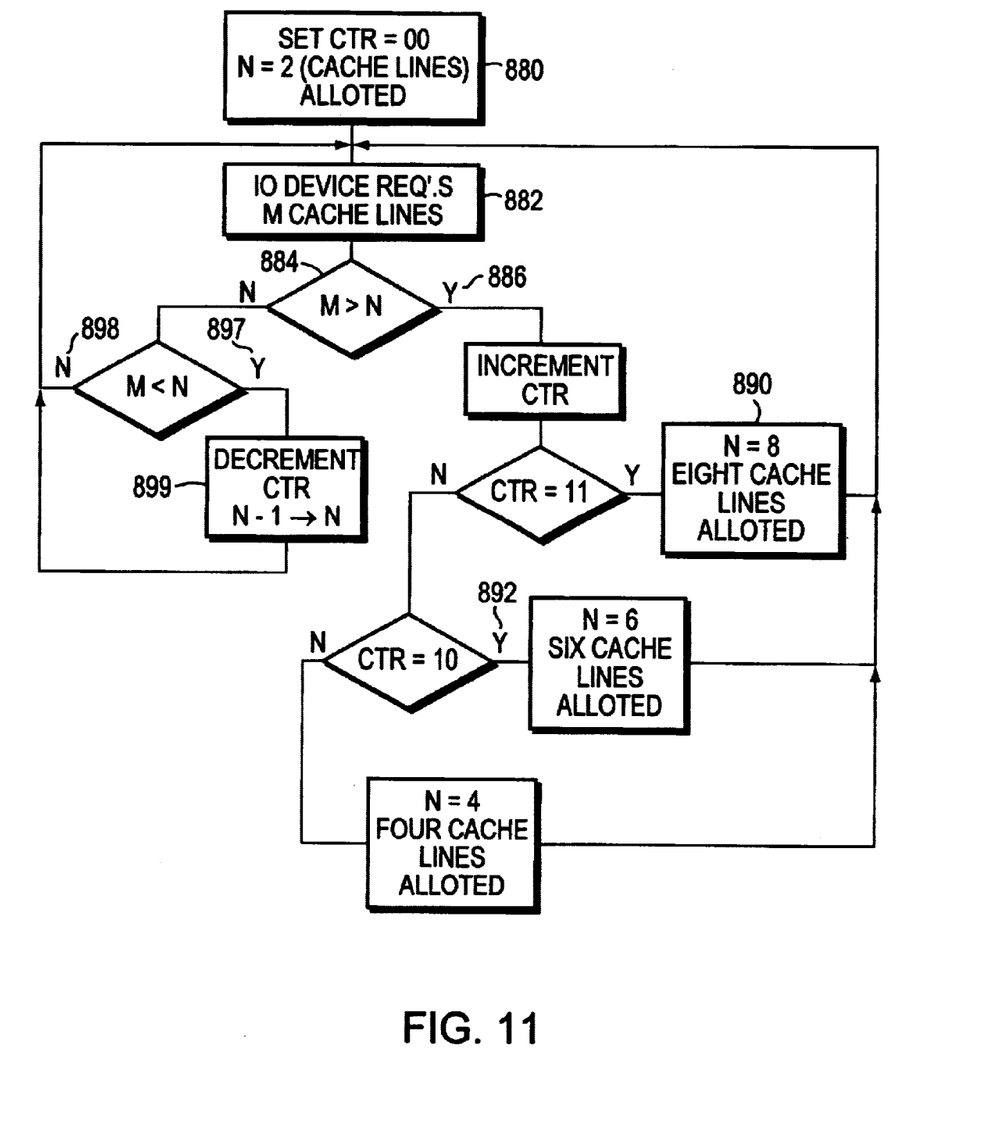
FIG. 11 is a flow chart of a counter operation of the hardware algorithm.

FIG. 11 shows the logic flow using the counter 605. When initially at "00," two cache lines 880 are allotted to the device, and a hardware variable N is set to two. N indicates how many cache lines are assigned to a particular IO device. When an IO device requests M cache lines 882, M is compared 884 to N. If M is greater than N, the counter is incremented 888. If the counter value is "11" (binary), eight cache lines are allotted and N is set to eight 890. If the counter equals "10" 892, six cache lines are allotted, and N is set to six 894. If the counter does not equal "10", it must equal "01" where four cache lines are allotted, and N is set to four 896. If M is equal to N 898, the number of cache lines allotted is not changed and N is not changed. If M is less than N 897, the counter is decremented, and N is reduced by one 899.

Figure 12:
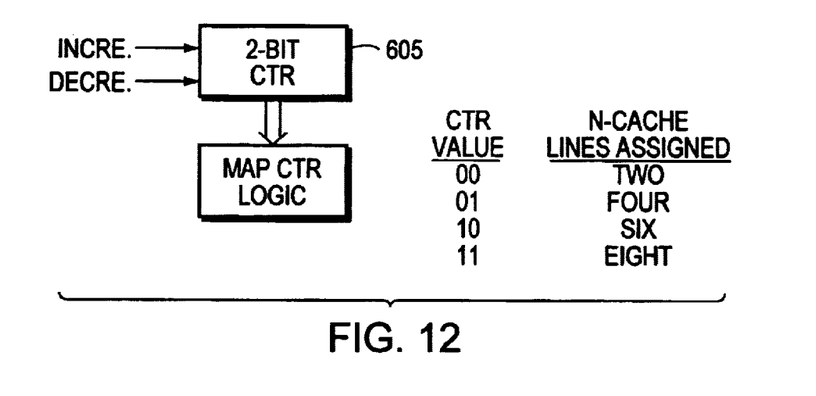
FIG. 12 is a block diagram of a one counter embodiment operated as in FIG. 11.

FIG. 12 shows the counter and a map for the counter 605 value. The value of the counter maps to the number of cache lines assigned to that device.

Figure 13:
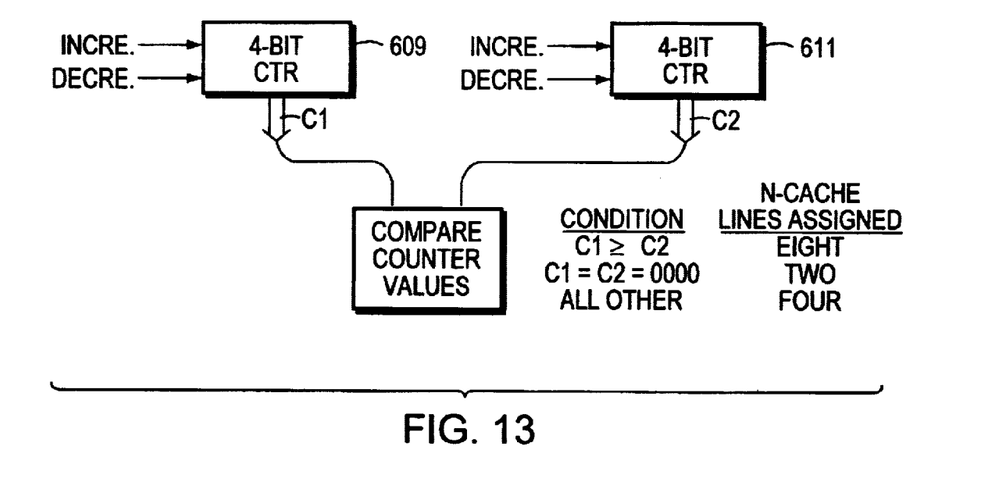
FIG. 13 is another block diagram of a two counter embodiment.

In another preferred embodiment, the algorithm logic firmware in the UPE 602 may use two counters 609 and 611. FIG. 13 is a block diagram of an more than two cache lines requested counter 609, and a second counter 611 of the number of the previous requests where less than two cache lines but more than one were requested. One is used to track those transactions that request more than two cache lines. The second tracks the number of the sixteen previous transactions of less than two cache lines but more that one. The counters are binary with four bits therefore running from 0000 to 1111 to hold the sixteen past occurrences. The first counter decrements if its value is greater than 000 and a request is processed that is not greater than four cache lines. The second counter decrements if its value is greater than 0000 and a request is processed that is either greater than four cache lines or is less than or equal to two cache lines. Both counters could be decremented at the same time if the transaction is two cache lines or less. The counters are arranged so that neither counter can be decremented below 0000 or incremented above 1111.

When determining how much data to pre-fetch, the first counter is compared to the second. If equal (excluding both being 0000) or the first counter is greater, then eight cache lines are pre-fetched. Otherwise only four cache lines are pre-fetched. If both counters are 0000, then two cache lines are pre-fetched.

The pre-fetch logic hardware 603 is preferably written in Verilog® HDL code and synthesized and mapped to logic gates in the ASIC. In one embodiment, the system doubles the cache size when it increases the size. When decreasing, preferably one cache line is removed.

It is well known in the art to interchangeably design hardware and firmware and general central processors to accomplish equivalent functions, and in the present invention such interchangeability may be found in other preferred embodiments.

Another preferred embodiment of the one counter 605 logic is as follows: Each slot on the I/O bus 910 has a two bit counter 605 assigned. Here the values of the two bits are as follows:

00=Fetch NONE (don't care)
01=Fetch 128 bytes (2 cache lines)
10=Fetch 256 bytes (4 cache lines)
11=Fetch 512 bytes (8 cache lines)
The first memory read multiple fetches 128 bytes.
128 Byte fetch:
  IF: Target disconnect due to lack of pre-fetched data, bump value to fetch 512 bytes next time, GOTO512Byte Fetch
    ELSEIF: Target disconnect on 256 bytes, continue with current Fetch size;
    ELSE: Master disconnect on 64, 128 Bytes, default to 128 byte fetch, GOTO 128 Byte Fetch;
512 Byte Fetch:
  IF: Target disconnect on 512 bytes, continue with current Fetch size;
    ELSEIF: Target disconnect on 256 bytes, GOTO 256 Byte Fetch (OR back to 128 Byte Fetch)
    ELSE: Master disconnect on 64, 128 bytes, default to 128 Byte Fetch, GOTO 128 Byte Fetch:
In another preferred embodiment, the byte values assigned to the two bit code above may be might increased or decreased as needed.

Still another preferred embodiment the pre-fetch counters 605 are set to indicate that a single cache line be allotted to a IO device controller. When a Memory Read Multiple command is issue by a device controller, the IO7 allots the single cache line. Preferably, a single bit is set to indicate one cache line and if reset it indicates two cache lines are to be allotted. When two cache lines are allotted, all subsequent allocations will be for two cache lines. The pre-fetch hardware (algorithm) logic acts independently for each slot When the supply of data is exhausted before the IO device disconnects, indicating that too few cache lines were allotted, the counter is shifted left (towards the most significant direction) which doubles the count value and the cache lines that will be allotted for the next Memory Read Multiple command. This "shift" condition will continue until the device disconnects before all the data is exhausted; or the device disconnects during the pre-fetch of the last cache line; or the pre-fetch limit is reached. Preferably, the pre-fetch limit is set to 32 cache line pairs or 4K bytes.

Once the shift condition is ended, the system will continue to optimize the allotted cache lines. If too little data is retrieved, in a subsequent MemoryReadMultiple command, an additional two cache lines are pre-fetched the next time. If too much is retrieved in two sequential MemoryReadMultiple commands, the count is decreased by one half the difference between what was pre-fetched and what was actually used by the device. For example, if eight cache lines were allocated, and the device used less than eight cache line pairs two times in a row, and if the second time the device used four cache line pairs the allocation would be reduced to six cache line pairs for the next MemoryReadMultiple command. If the next time more than four cache line pairs were used, then five cache line pairs would be allocated for the subsequent time.

The reason that two sequential over allotments are used in the above scenario is that it has been found that reducing after one over allotment is an inefficient path to a proper allotment for an I/O device. When the allotment begins with two cache lines allotted, and more are needed for an I/O device, the allotment is increased as described above. Say 128 byte are allotted and 1024 required. The invention will increase the allotment to finally return the 1024 bytes, but the last increment that might be delivered might be 128 bytes (the initial amount allotted), and to decrease the allotment back to 128 bytes in response would cause the operation to cycle and never zero in on the correct number of bytes allotted.

For the present invention the operations and interfaces to the accelerated graphics port (AGP) and the PCI-x ports, and any DMA write requests are not relevant to the discussion of the present invention. This is so because the PCI-x protocol and the AGP protocol specifications both require a given number of bytes to be transferred each time, so in that case the IO7 will always transfer that given number of bytes. When a write is requested there is no need to apply the present invention because the initial allotment of cache resources to the write buffering of a given device attached to the IO7 will (practically) always keep up with the I/O device. If the unusual occurrence occurs that the write cannot keep up then the device may have to wait, but that will be rare. However, in principle the invention could be used for adaptive write buffering.

What is claimed is:

1. A method for allotting buffer memory, the buffer memory organized in discrete blocks of memory, the buffer memory configured to store data read from a main memory, and destined for an I/O device, the method comprising the steps of:

allotting a buffer memory of a predetermined size;

transferring the data to the device via the buffer memory, storing the number of blocks used by the same I/O device over a number of previous data transfers to the I/O device; and comparing the number used to the given number allotted, and, determining if the predetermined size of the buffer memory accommodates the I/O device, and, if not, changing the size of the buffer memory.

2. The method as defined in claim 1 wherein if the step of comparing indicates that too few blocks were allotted, then the step of changing includes the step of doubling the number of blocks.

3. The method as defined in claim 1 wherein if the comparing indicates that too many blocks were allotted, then the step of changing includes the step of reducing the number by one half.

4. The method as defined in claim 1 where the number of previous data transfers is sixteen.

5. The method as defined in claim 1 further comprising the steps of:

first counting of and storing in a first counter the number of times that the previous data transfers were more that two blocks, second counting of and sorting in a second counter the number of the times that the previous data transfers were more than one but less than two blocks;

decrementing the first counter if its present value is greater than zero and where the present transfer is for less than four blocks;

decrementing the second counter if its value is greater than zero, and the present transfer is for more than four blocks or less than or equal to two blocks, and where neither counter value can go below zero; and comparing the first counter value to the second counter value and in response to such comparing allotting a buffer memory size of two blocks if both values are zero, of eight blocks if the first values is greater than the second value or if both values are equal but not zero, and four block is all other cases.

6. A system for allotting buffer memory, the buffer memory organized in discrete blocks of memory, the buffer memory configured to store data read from a main memory, and destined for an I/O device, comprising:

means for allotting- buffer memory of a predetermined size;

means for transferring the data to the device via the buffer memory, means for storing the number of blocks used by the same I/O device over a number of previous data transfers to the I/O device;

means for comparing the number used to the given number allotted and, means for determining if the predetermined size of the buffer memory accommodates the I/O device, and, if not, changing the size of the buffer memory.

7. The system as defined in claim 6 wherein if the comparing indicates that too few blocks were allotted, then further comprising means for doubling the number of blocks.

8. The system as defined in claim 6 wherein if the comparing indicates that too many blocks were allotted, then further comprising means for reducing the number by one half.

9. The method as defined in claim 6 where the number of previous data transfers is sixteen.

* * * * *